US012605574B2

(12) United States Patent
Kim

(10) Patent No.: US 12,605,574 B2
(45) Date of Patent: Apr. 21, 2026

(54) FACE MASK HAVING IMPROVED AIR PERMEABILITY

(71) Applicant: Hyungchul Kim, Incheon (KR)

(72) Inventor: Hyungchul Kim, Incheon (KR)

( * ) Notice: Subject to any disclaimer, the term of this patent is extended or adjusted under 35 U.S.C. 154(b) by 673 days.

(21) Appl. No.: 18/009,906

(22) PCT Filed: Jun. 10, 2021

(86) PCT No.: PCT/KR2021/007265
§ 371 (c)(1),
(2) Date: Dec. 12, 2022

(87) PCT Pub. No.: WO2021/251767
PCT Pub. Date: Dec. 16, 2021

(65) Prior Publication Data

US 2023/0330450 A1 Oct. 19, 2023

(30) Foreign Application Priority Data

Jun. 11, 2020 (KR) ........................ 10-2020-0070727

(51) Int. Cl.
*A62B 18/10* (2006.01)
*A41D 13/11* (2006.01)
*A62B 23/02* (2006.01)

(52) U.S. Cl.
CPC ............ *A62B 18/10* (2013.01); *A41D 13/113* (2013.01); *A62B 23/025* (2013.01)

(58) Field of Classification Search
CPC .............................. A41D 13/113; A62B 18/10
See application file for complete search history.

(56) References Cited

U.S. PATENT DOCUMENTS 3,664,335 A * 5/1972 Boucher .............. A41D 13/113
128/206.19
5,325,892 A * 7/1994 Japuntich ............. A62B 18/084
137/855
6,584,976 B2 * 7/2003 Japuntich ............... A41D 13/11
128/205.27

(Continued)

FOREIGN PATENT DOCUMENTS

CN 2803437 Y 8/2006
CN 105996229 A * 10/2016 ............. A41D 31/02

(Continued)

*Primary Examiner* — Bradley H Philips
(74) *Attorney, Agent, or Firm* — Bridgeway IP Law Group, PLLC; Sang Ho Lee; Hyun Woo Shin

(57) ABSTRACT

Disclosed is a face mask having improved air permeability. Provided is a face mask having improved air permeability according to one aspect of the present invention, the face mask including a mask main body configured to cover a part of a user's face including the user's nose and mouth, a folded region formed by folding a part of the mask main body to increase a vent area and decrease airflow resistance when breathing, and support bands coupled to the mask main body and configured to support the mask main body so that the mask main body is in close contact with the user's face, in which the folded region includes a plurality of folded parts formed by folding the mask main body multiple times in opposite directions along folding lines extending in a longitudinal direction.

5 Claims, 10 Drawing Sheets

(56) References Cited

U.S. PATENT DOCUMENTS

| | | | | |
|---|---|---|---|---|
| 2006/0130841 | A1 * | 6/2006 | Spence .............. | A41D 13/1107<br>128/206.19 |
| 2009/0078264 | A1 | 3/2009 | Martin et al. | |
| 2013/0186414 | A1 * | 7/2013 | Suzuki ............... | A41D 13/1161<br>128/863 |

FOREIGN PATENT DOCUMENTS

| | | | | | |
|---|---|---|---|---|---|
| CN | 108720129 | A | * | 11/2018 | ......... A41D 13/1107 |
| JP | 3126242 | U | * | 10/2006 | |
| JP | 2012115647 | A | * | 6/2012 | |
| KR | 10-1013242 | B1 | | 2/2011 | |
| KR | 10-1782477 | B1 | | 10/2017 | |
| KR | 10-2018-0011387 | A | | 2/2018 | |

* cited by examiner

FACE MASK HAVING IMPROVED AIR PERMEABILITY

TECHNICAL FIELD

The present invention relates to a face mask having improved air permeability.

BACKGROUND ART

Depending on the use and function of the mask, the masks are classified into various types of masks including a thermal mask, a health mask, a dustproof mask, and a gas mask. Among these masks, the health mask refers to a mask worn for hygienic health purposes to prevent the inhaling and scattering of germs and dust. Recently, because of an increase in fine dust and frequent occurrence of yellow dust, there is an increasing demand for health masks to protect the respiratory organ from the fine dust and yellow dust.

The health mask is made of a material having a high-performance filtering function to maximally prevent the introduction of germs or dust from the outside. However, this material lowers an air transmittance rate, which inconveniences the user when breathing.

The functional material of the mask increases airflow resistance, and the increase in airflow resistance may cause the mask user's breathing inconvenience, decrease the amount of breathing and the supply amount of oxygen, and causes physical abnormalities such as headaches. In addition, the increase in airflow resistance of the masks may cause health abnormalities in patients with respiratory diseases, elderly persons, and pregnant women and cause abnormalities in development of respiratory organs of infants or children.

In the industrial field, workers sometimes do not use the masks frequently to communicate with the workers during work or to escape from the inconvenience of breathing.

Therefore, there have been developed masks for minimizing the user's discomfort and health problems while maintaining the functionality of the currently used masks.

DOCUMENT OF RELATED ART

Patent Document

Korean Patent No. 10-1782477 (Sep. 21, 2017)

DISCLOSURE

Technical Problem

An object of the present invention is to provide a face mask, in which a plurality of folded parts, which is formed by folding a mask main body, which covers a user's face, nose, and mouth, multiple times in a longitudinal direction increases a vent area, in which the mask main body adjoins outside air, thereby improving air permeability.

Technical Solution

One aspect of the present invention provides a face mask having improved air permeability, the face mask comprising: a mask main body configured to cover a part of a user's face including the user's nose and mouth; a folded region formed by folding a part of the mask main body to increase a vent area and decrease airflow resistance when breathing; and support bands coupled to the mask main body and configured to support the mask main body so that the mask main body is in close contact with the user's face, in which the folded region includes a plurality of folded parts formed by folding the mask main body multiple times in opposite directions along folding lines extending in a longitudinal direction.

The plurality of folded parts may be folded so that any one of the plurality of folded parts partially overlaps another adjacent folded part among the plurality of folded parts.

Intervals between the plurality of folded parts may increase outward as the plurality of folded parts is unfolded when the mask main body is curved to cover the user's face.

The plurality of folded parts may include: central folded regions in which the plurality of folded parts is unfolded when the mask main body is curved; and upper/lower end folded regions in which upper and lower ends of the plurality of folded parts are coupled to be fixed in a folded state.

The mask main body may include: a filter part configured to filter out foreign substances and germs contained in air passing through the mask main body; and a pair of cover parts having higher air permeability than the filter part and configured to cover front and rear outer surfaces of the filter part to ensure an air flow passageway by preventing a situation in which outer surfaces of the filter part folded in the folded region come into contact with one another and an effective area of the filter part decreases.

Left and right sides of the plurality of folded parts may be symmetric with respect to an imaginary longitudinal centerline that bisects the mask main body.

The face mask having improved air permeability may further include an exhaust valve coupled to the mask main body and configured to discharge air in one direction during exhalation.

An opening portion, which is formed by removing a part of the mask main body, is formed in the mask main body and provided on the imaginary longitudinal centerline to reduce exhaust resistance, and the exhaust valve may be coupled to the mask main body to cover the opening portion.

The exhaust valve may have a plurality of exhaust holes through which air flows along one surface edge of the exhaust valve.

The face mask having improved air permeability may further include an inner cover configured to cover one surface of the exhaust valve and filter out respiratory droplets and germs discharged to the outside through the exhaust valve.

The face mask having improved air permeability may further include: a first support part foldably coupled to an upper end of the mask main body and configured to cover the user's nose; and a second support part foldably coupled to a lower end of the mask main body and configured to cover the user's chin.

Advantageous Effects

According to the present invention, the plurality of folded parts, which is formed by folding the mask main body, which covers the user's face, nose, and mouth, multiple times in the longitudinal direction, may increase the vent area, in which the mask main body adjusts the outside air, thereby improving air permeability.

DESCRIPTION OF REFERENCE NUMERALS

Figure 1:
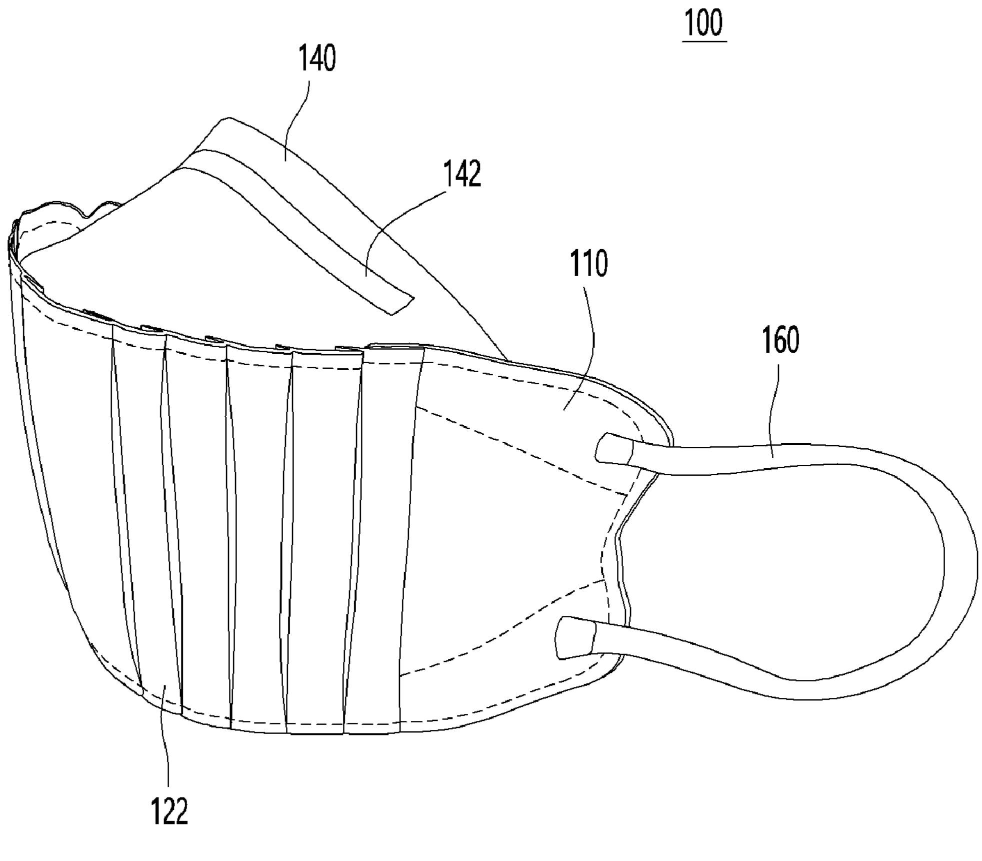
FIG. 1 is a perspective view illustrating a face mask having improved air permeability according to an embodiment of the present invention.

100: Face mask
110: Mask main body
112: Opening portion
114: Space portion
116: Filter part
118: First cover part
119: Second cover part
120: Folded region
122: Folded part
124: Central folded region
126: Upper/lower end folded region
130: Exhaust valve
132: Exhaust hole
140: First support part
142: Support frame
150: Second support part
160: Support band
170: Inner cover

Mode for Disclosure

The present invention may be variously modified and may have various exemplary embodiments, and particular exemplary embodiments illustrated in the drawings will be described in detail below. However, the description of the exemplary embodiments is not intended to limit the present invention to the particular exemplary embodiments, but it should be understood that the present invention is to cover all modifications, equivalents and alternatives falling within the spirit and technical scope of the present invention. In the description of the present invention, the specific descriptions of publicly known related technologies will be omitted when it is determined that the specific descriptions may obscure the subject matter of the present invention.

The terms such as “first” and “second” may be used to describe various constituent elements, but the constituent elements should not be limited by the terms. These terms are used only to distinguish one constituent element from another constituent element.

The terminology used herein is used for the purpose of describing particular embodiments only and is not intended to limit the present invention. Singular expressions include plural expressions unless clearly described as different meanings in the context. The terms “comprises,” “comprising,” “includes,” “including,” “containing,” “has,” “having” or other variations thereof are inclusive and therefore specify the presence of stated features, integers, steps, operations, elements, and/or components, but do not preclude the presence or addition of one or more other features, integers, steps, operations, elements, components, and/or groups thereof.

Like reference numerals indicate like constituent elements, and a repeated description thereof will be omitted.

In addition, in the contact relationship between respective constituent elements, the term “coupling” not only means physical and direct contact between the constituent elements but also be used as a concept including a case in which another constituent element is interposed between the respective constituent elements and in contact with the respective constituent elements.

Hereinafter, the embodiments according to a face mask 100 according to the present invention will be described in detail with reference to the accompanying drawings. In the description of the exemplary embodiments with reference to the accompanying drawings, the same or corresponding constituent elements are assigned with the same reference numerals regardless of reference numerals, and the repetitive description thereof will be omitted.

An embodiment of the present invention provides a face mask 100 having improved air permeability, the face mask 100 including: a mask main body 110 configured to cover a part of a user’s face including the user’s nose and mouth; a folded region 120 formed by folding a part of the mask main body 110 to increase a vent area; and support bands 160 coupled to the mask main body 110 and configured to be caught by the user’s ears to support the mask main body 110 so that the mask main body 110 is in close contact with the user’s face. The folded region 120 includes a plurality of folded parts 122 formed by folding the mask main body 110 multiple times in opposite directions along folding lines extending in a longitudinal direction.

In this case, in the face mask 100 of the present embodiment, the plurality of folded parts 122, which is formed by folding the mask main body 110, which covers the user’s face, nose, and mouth, multiple times in the longitudinal direction, increases the vent area, in which the mask main body 110 adjoins the outside air, thereby improving air permeability.

Therefore, in the present embodiment, in a state in which the user wears the face mask 100 of the present embodiment, it is possible to minimize breathing discomfort, which the user feels, while maintaining a filtering effect of the face mask 100 in the related art.

In general, in the natural world, flow (airflow) resistance, which occurs when a fluid (including air) passes through a resistive element such as a filter at a constant flow rate, tends to be inversely proportional to the square of an area of an effective surface of the filter.

In the case of the face mask 100 of the present embodiment, depending on the structure of the plurality of folded parts 122, a surface area of the filter may increase by about 50% to 80% in accordance with the folded region (a folding width and the number of times of folding). Therefore, the airflow resistance may decrease by about 55% to 69%.

The decrease in airflow resistance may maintain the breathing convenience, increase the amount of the user's breathing, and normally maintain the supply amount of oxygen, thereby inhibiting the occurrence of physical abnormalities such as headaches. Further, it is possible to prevent health abnormalities in patients with respiratory diseases, elderly persons, and pregnant women and inhibit abnormalities in development of respiratory organs of infants or children.

In addition, according to the characteristics of the present embodiment, the user may perform low and heavy-intensity exercises such as jogging and climbing stairs even when wearing the face mask 100 of the present embodiment.

Meanwhile, the decrease in airflow resistance of the mask main body 110 may prevent a situation in which the mask main body 110 is pushed into the user's face and brought into close contact with the user's nose and mouth because of negative breathing pressure even when the amount of breathing increases. Therefore, it is possible to prevent a problem of breathing inconvenience.

Furthermore, when the surface area of the mask main body 110 increases, a speed of air passing through a unit area decreases, such that the performance in filtering out fine dust, yellow dust, and the like. Further, the amount of contaminants collected for each unit area decreases, which makes it possible to increase the time for which the filtering performance continues in comparison with the mask in the related art.

Hereinafter, the configurations of the face mask 100 according to the present embodiment will be more specifically with reference to FIGS. 1 to 4.

As illustrated in FIGS. 1 to 4, the mask main body 110 may cover a part of the user's face including the user's nose and mouth. The mask main body 110 may be made of a material that prevents introduction of germs or foreign substances such as yellow dust and fine dust from the outside. Depending on the use of the mask main body 110, the material of the mask main body 110 may be selectively changed.

More specifically, the mask main body 110 may include: a filter part 116 configured to filter out foreign substances and germs contained in air passing through the mask main body 110; and a pair of cover parts 118 and 119 configured to cover two opposite outer surfaces of the filter part 116, i.e., front and rear outer surfaces of the filter part 116 so as to prevent outer surfaces of the filter part 116 folded in the folded region 120 from coming into contact with one another.

In other words, the pair of cover parts 118 and 119 may prevent a situation in which the outer surfaces of the filter part 116 come into contact with one another, which decreases a filtering effective area. Further, the pair of cover parts 118 and 119 may ensure spaces between the outer surfaces of the filter part 116, and air may flow in the spaces.

In this case, the filter part 116 may be made of microfibers and generate static electricity to filter out foreign substances or germs contained in air. Furthermore, the filter part 116 may be configured as an MB filter, a nano filter, or the like excellent in filtering efficiency.

Meanwhile, the cover parts 118 and 119 may be made of non-woven fabrics and have higher air permeability than the filter part 116. The cover parts 118 and 119 may cover two opposite outer surfaces of the filter part 116 to prevent the outer surfaces of the filter part 116 folded in the folded region 120 from coming into contact with one another. In other words, the cover parts 118 and 119 may cover the outer surfaces of the filter part 116 and serve as spacers between the portions of the folded filter part 116. More specifically, the cover parts 118 and 119 are provided between the outer surfaces of the folded filter part 116 and form spaces between the outer surfaces of the folded filter part 116, such that air passing through the filter part 116 may be induced to flow through the cover part 118.

Therefore, the cover parts 118 and 119 may cover the two opposite outer surfaces of the filter part 116 and prevent a situation in which a plurality of layers is formed as the outer surfaces of the filter part 116 come into contact with one another at the portion where the filter part 116 is folded. Therefore, it is possible to prevent deterioration in vent effective area of the filter part 116, thereby improving overall air permeability of the folded region 120.

Figure 4:
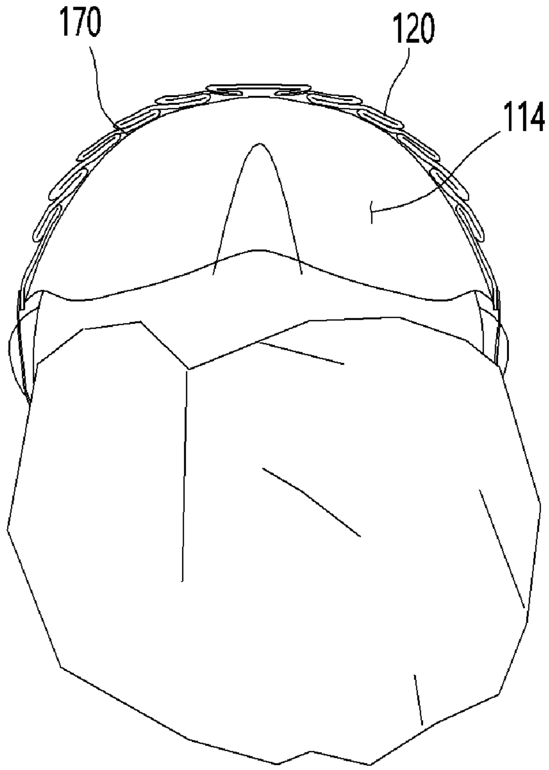
FIG. 4 is a cross-sectional view taken along line B-B in FIG. 2 for explaining the face mask having improved air permeability according to the embodiment of the present invention.

In addition, as illustrated in FIG. 4, the pair of cover parts 118 and 119 may include a first cover part 118 configured to cover one side outer surface, i.e., an outer-outer surface of the filter part 116, and a second cover part 119 configured to cover the other side outer surface, i.e., an inner-outer surface of the filter part 116.

Meanwhile, for example, the filter part 116 may have a thickness of about 0.1 to 0.2 mm. The cover parts 118 and 119 may each have a thickness of about 0.5 mm or more, i.e., larger than the thickness of the filter part 116.

As illustrated in FIGS. 1 to 4, the folded region 120 may be formed by folding a part of the mask main body 110 to increase the vent area and decrease the airflow resistance. The folded region 120 may have a three-dimensional structure made by folding a part of the mask main body 110. Therefore, in comparison with a general flat mask, the folded region 120 may provide a larger vent area within a peripheral length of the mask main body 110 that covers the user's face.

As illustrated in FIGS. 1 to 4, in the folded region 120, the plurality of folded parts 122 may be formed by folding the mask main body 110 multiple times in the opposite directions along the folding lines extending in the longitudinal direction.

More specifically, the plurality of folded parts 122 may be formed in a shape similar to a zigzag shape by folding the mask main body 110 forward and rearward along the folding lines extending in the longitudinal direction.

As illustrated in FIGS. 1 to 4, the plurality of folded parts 122 may be folded so that any one of the plurality of folded parts 122 partially overlaps another adjacent folded part among the plurality of folded parts 122.

In addition, the plurality of folded parts 122 may be folded so that any one of the plurality of folded parts 122 does not overlap another folded part among the plurality of folded parts 122.

As illustrated in FIGS. 1 to 4, the plurality of folded parts 122 is unfolded when the mask main body 110 is curved to cover the user's face, such that intervals between folded portions protruding outward may be increased outward.

Figure 3:
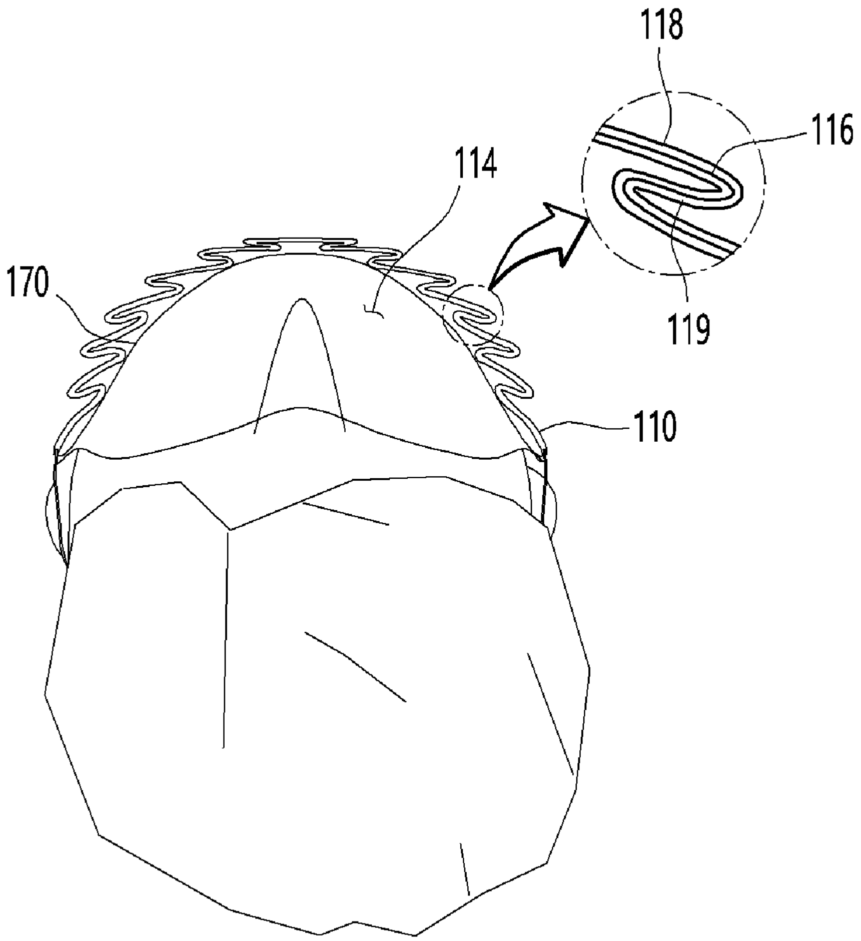
FIG. 3 is a cross-sectional view taken along line A-A in FIG. 2 for explaining the face mask having improved air permeability according to the embodiment of the present invention.

Therefore, as illustrated in FIG. 3, in case that the user wears the face mask 100 of the present embodiment, the mask main body 110 may be curved along the user's face. When the mask main body 110 is curved, the plurality of folded parts 122 is partially unfolded, such that an area, which adjoins the outside air, i.e., a vent effective area, into which the outside air may be introduced, may increase.

In addition, as illustrated in FIGS. 1 to 4, the plurality of folded parts 122 may each include a central folded region 124 which is unfolded when the mask main body 110 is curved, and an upper/lower end folded region 126 coupled so that upper and lower ends of the plurality of folded parts 122 are fixed in a folded state.

Therefore, the upper/lower end folded regions 126 of the plurality of folded parts 122 may be fixed as illustrated in FIG. 4. The central folded regions 124 are unfolded as illustrated in FIG. 3, such that the vent area of the mask main body 110 may be increased.

Meanwhile, the upper/lower end folded regions 126 may be coupled by being sewed. Alternatively, the upper/lower end folded regions 126 may be coupled by a method such as ultrasonic joining or thermal bonding. In addition, a first support part 140 and a second support part 150, which will be described below, may also be coupled to the mask main body 110 by the above-mentioned method.

Figure 2:
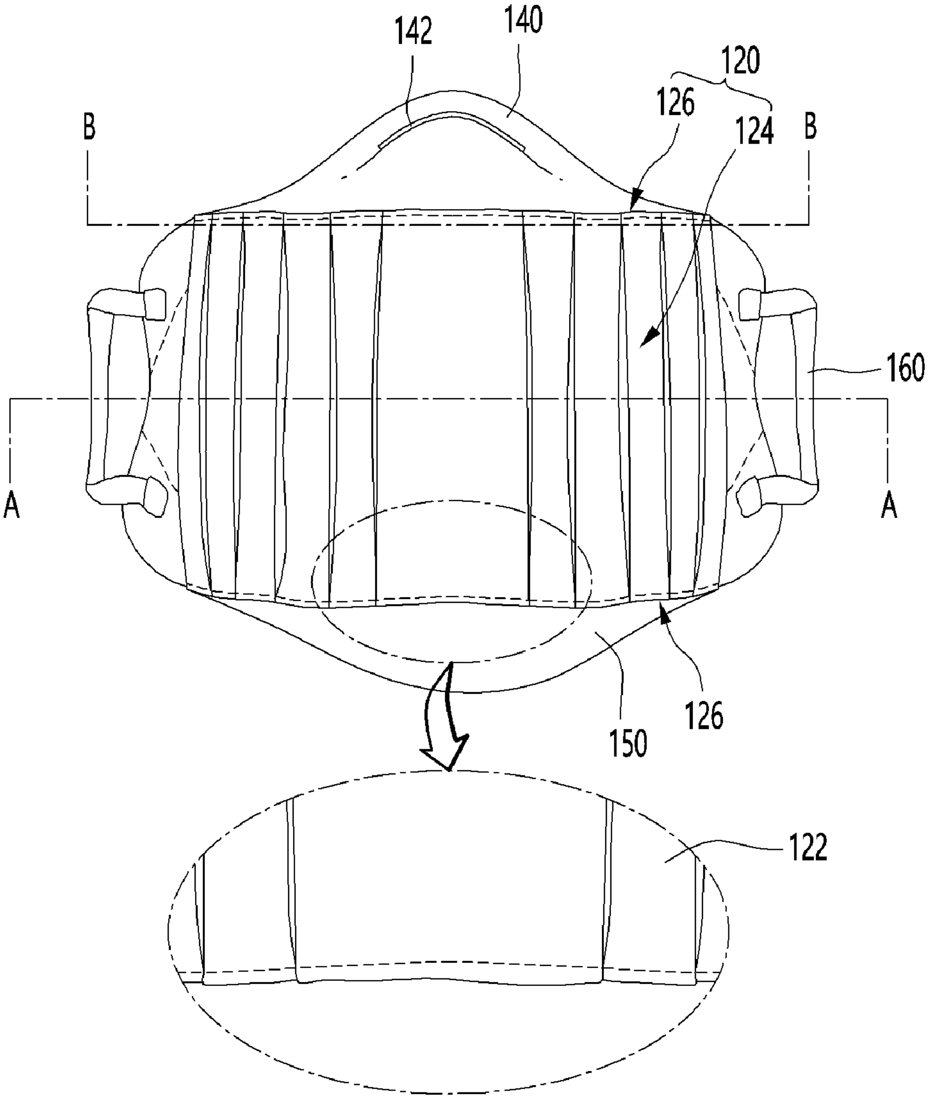
FIG. 2 is a front view illustrating the face mask having improved air permeability according to the embodiment of the present invention.

As illustrated in FIGS. 2 to 4, left and right sides of the plurality of folded parts 122 may be symmetrically formed with respect to an imaginary longitudinal centerline that bisects the mask main body 110.

As illustrated in FIGS. 1 and 2, the first support part 140 may be foldably coupled to an upper end of the mask main body 110 and cover the user's nose. The second support part 150 may be foldably coupled to a lower end of the mask main body 110 and cover the user's chin.

As one example, as the first support part 140 and the second support part 150 are unfolded from the mask main body 110, the mask main body 110 may be curved, and the folded region 120 may be unfolded. A space portion 114 may be formed between the mask main body 110 and the user's face in accordance with the shape of the mask main body 110.

In addition, as illustrated in FIGS. 1 and 2, a support frame 142 may be coupled to the first support part 140 to support the user's nose ridge and support the position of the first support part 140 so that the first support part 140 is in close contact with the user's face. In other words, the support frame 142 may vary to correspond to the shape of the user's nose ridge and bring the first support part 140 into contact with the user's face skin (see FIG. 7).

In addition, in a state in which the first support part 140 and the second support part 150 are formed on one surface of the mask main body 110 and folded, the first support part 140 and the second support part 150 may cover one surface of the mask main body 110 and prevent contamination from the outside (see FIG. 10A).

As illustrated in FIG. 3, an inner cover 170 may be coupled to one surface of the mask main body 110 and cover a surface that comes into contact with the user's face (see FIG. 10C).

As illustrated in FIGS. 1 to 3, the support bands 160 may be coupled to the mask main body 110 and support the mask main body 110 so that the mask main body 110 is in close contact with the user's face. The support bands 160 may be respectively provided at left and right sides of the mask main body 110, such that two opposite ends of one support band 160 may be coupled to one end of the mask main body 110 while defining a ring shape.

The support bands 160 may be respectively caught by the user's two ears and support the mask main body 110 so that the mask main body 110 covers the user's face. The support bands 160 may be made of a material having elasticity, such that the support bands 160 may elastically support the mask main body 110 regardless of the size of the user's face so that the mask main body 110 covers the user's face.

Next, components of a face mask 100 mounted with an exhaust valve 130 according to another embodiment of the present invention will be described with reference to FIGS. 5 to 10. A description of the components identical to the components of the above-mentioned embodiment will be omitted.

The face mask 100 according to another embodiment of the present invention is in a state in which the exhaust valve 130 is additionally installed on the mask main body 110 of the above-mentioned embodiment. The exhaust valve 130 provides a passageway through which air is discharged to the outside of the mask main body 110 from the inside of the mask main body 110, thereby eliminating breathing discomfort caused to the user when the user uses the mask.

As illustrated in FIGS. 5 to 9, the exhaust valve 130 may be coupled to the mask main body 110 and discharge air in one direction. More specifically, the exhaust valve 130 may block the introduction of air from the outer surface of the mask of the present embodiment and provide the passageway through which air is discharged from inside to outside. The exhaust valve 130 may implement the circulation of air that is introduced through the folded region 120 and discharged through the exhaust valve 130 (see FIG. 8).

More specifically, the exhaust valve 130 may control a flow of air by using negative pressure generated by the user's breathing. The passageway is blocked when the user breathes in, and the passageway is partially opened when the user breathes out, which may induce air to flow in one direction from the inside of the mask main body 110 to the outside of the mask main body 110.

In addition, the inner cover 170 may be disposed on the exhaust valve 130. The inner cover 170 may be made of a material such as a non-woven fabric and serve as a filter to filter out germs discharged to the outside from the inside of the face mask 100 of the present embodiment. With the arrangement of the inner cover 170, it is possible to prevent, to a certain degree, germs from being directly transferred into the air and another person through the exhaust valve 130.

In addition, because the exhaust valve 130 provides the passageway through which air is discharged to the outside of the mask main body 110, a ventilatory volume between the inside and outside of the mask main body 110 may increase, which may lower a temperature of the user's face covered by the mask main body 110 and provide high comfort.

Figure 10:
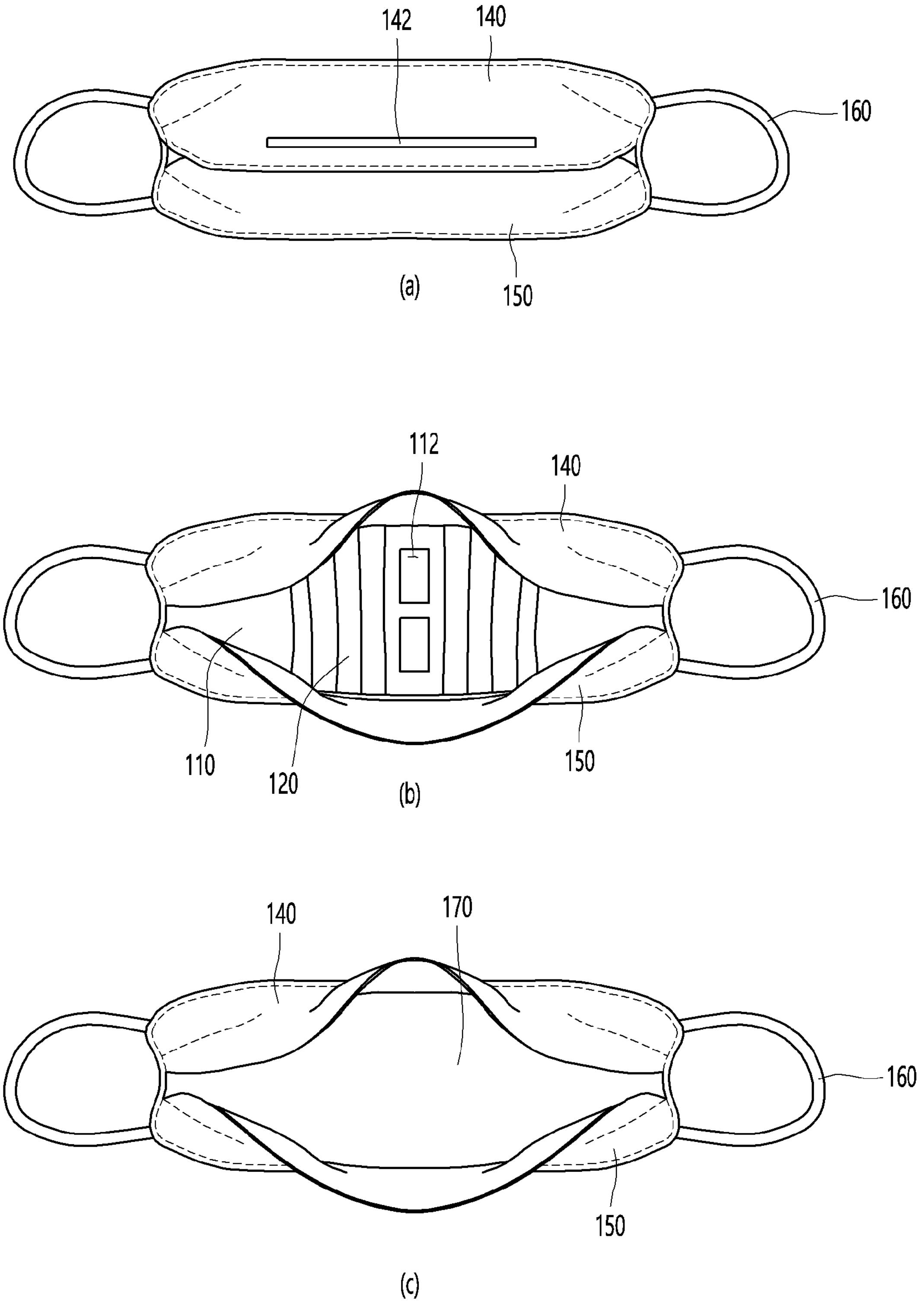
FIG. 10 is a rear view illustrating the face mask having improved air permeability that includes the exhaust valve according to another embodiment of the present invention.

As illustrated in FIG. 10, an opening portion 112 may be formed in the mask main body 110 and provided on the imaginary longitudinal centerline. The exhaust valve 130 may be coupled to the mask main body 110 to cover the opening portion 112.

More specifically, because an opened area of the opening portion 112 increases in a vertical direction, the opening portion 112 may be divided into a plurality of regions to prevent a situation in which the opening portion 112 is spread and a supporting force of the mask main body 110 is decreased. The exhaust valve 130 may cover all the plurality of opening portions 112 and be coupled to the mask main body 110. In addition, inner surfaces of the plurality of opening portions 112 may be covered by the inner cover 170.

Figure 5:
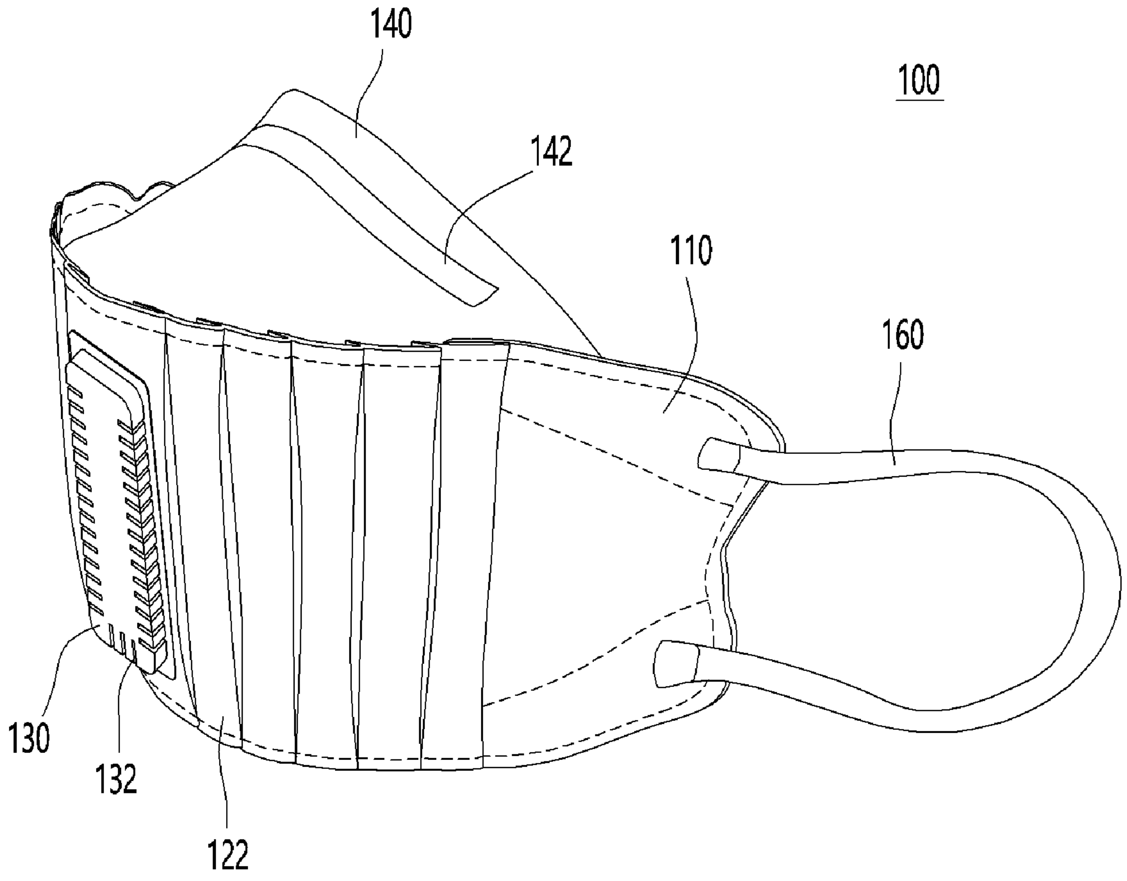
FIG. 5 is a perspective view illustrating the face mask having improved air permeability that includes an exhaust valve according to another embodiment of the present invention.
Figure 6:
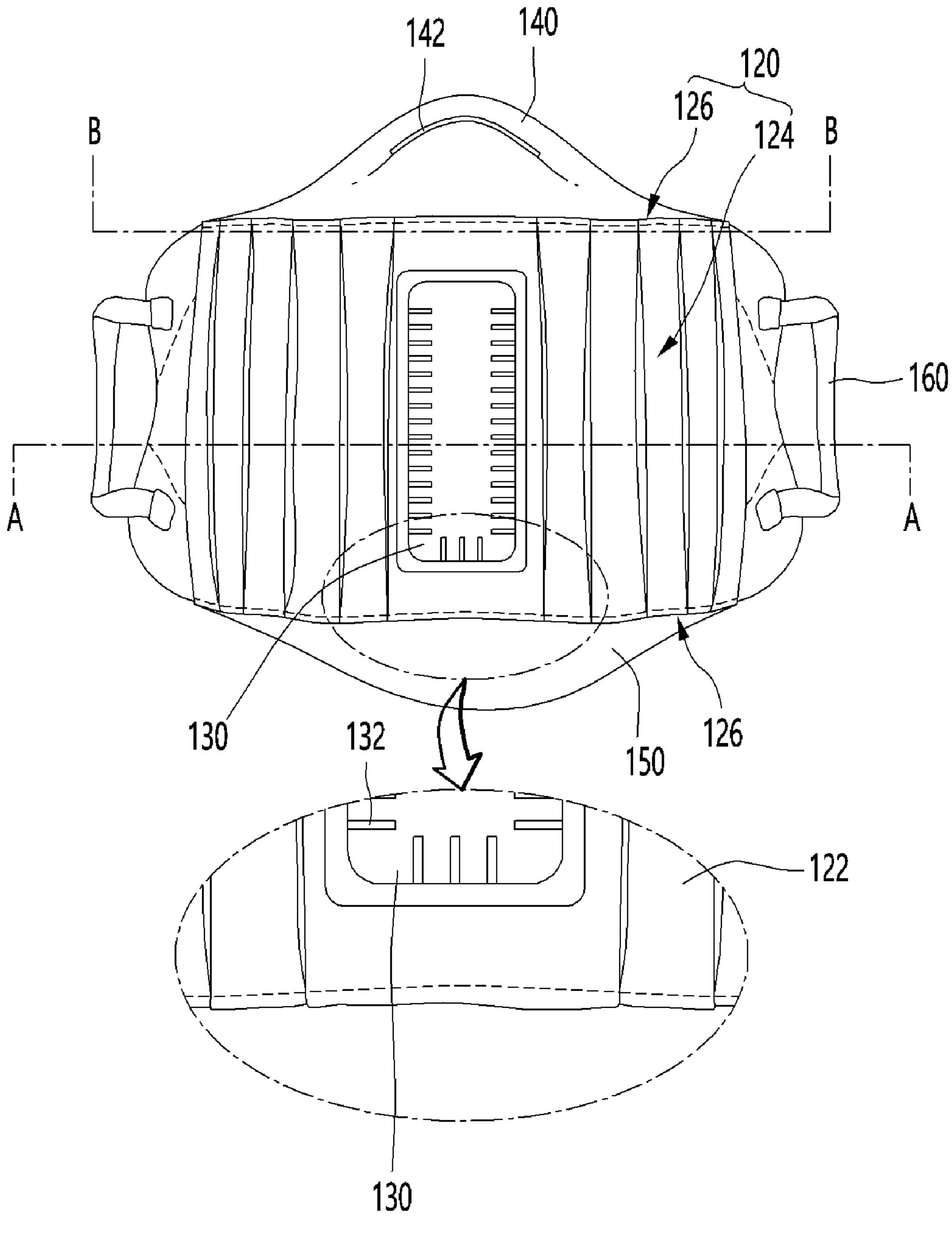
FIG. 6 is a front view illustrating the face mask having improved air permeability that includes the exhaust valve according to another embodiment of the present invention.

As illustrated in FIGS. 5 and 6, the exhaust valve 130 may have a plurality of exhaust holes 132 through which air may flow along one surface edge of the exhaust valve 130. In addition, some of the plurality of exhaust holes 132 may be formed at a lower side of one surface of the exhaust valve 130 so as to correspond to a flow direction of exhalation discharged from the user's nose in the state in which the mask main body 110 covers the user's face.

Furthermore, as illustrated in FIG. 6, the plurality of exhaust holes 132 may be formed at an edge, except for one surface of the exhaust valve 130. Therefore, the structure of the plurality of exhaust holes 132 may prevent rainwater from being introduced into the mask main body 110 through the exhaust holes 132.

Figure 7:
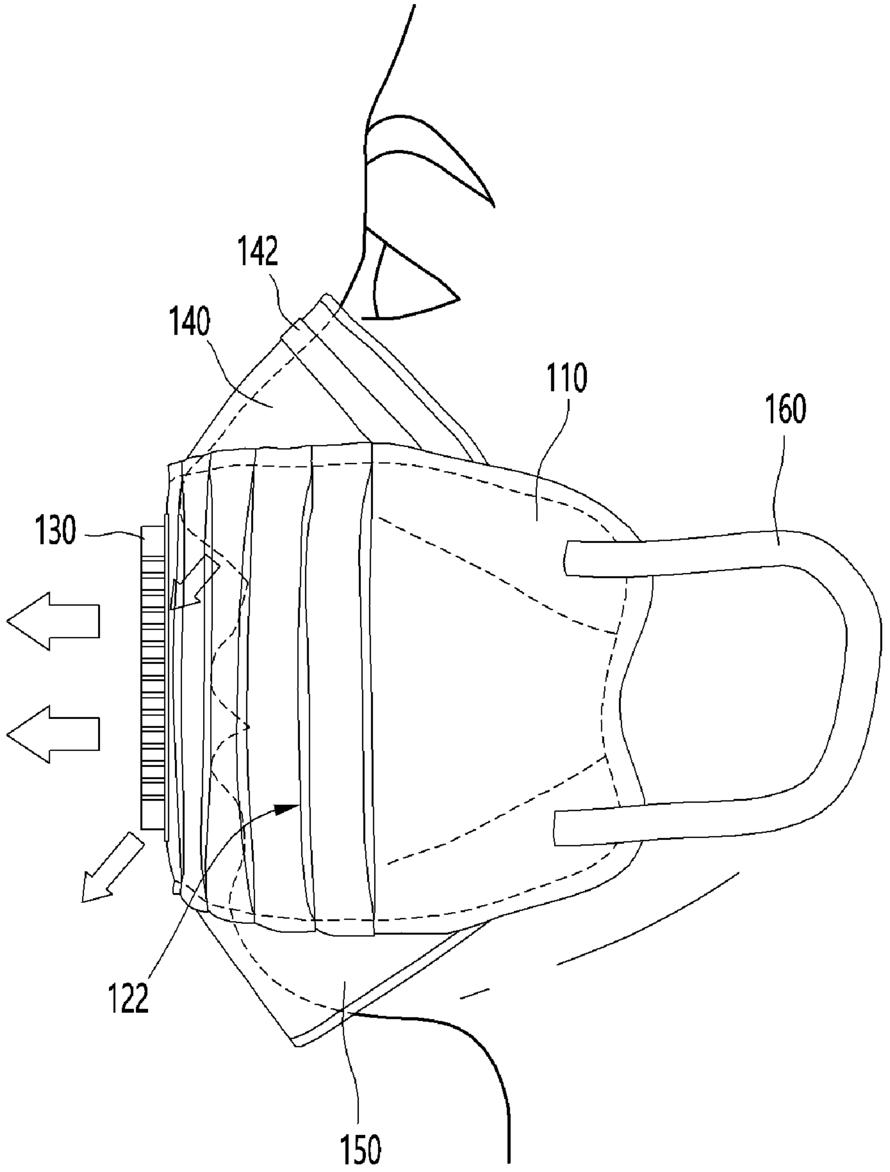
FIG. 7 is a use state side view illustrating the face mask having improved air permeability that includes the exhaust valve according to another embodiment of the present invention.
Figure 8:
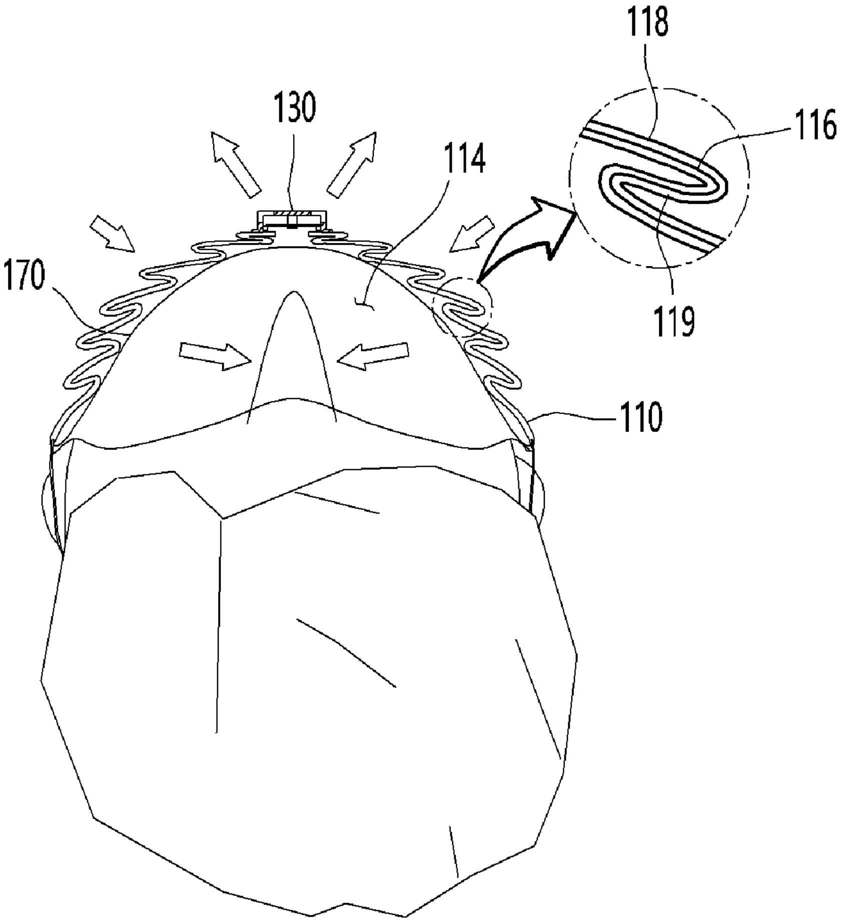
FIG. 8 is a cross-sectional view taken along line A-A in FIG. 6 for explaining the face mask having improved air permeability that includes the exhaust valve according to another embodiment of the present invention.
Figure 9:
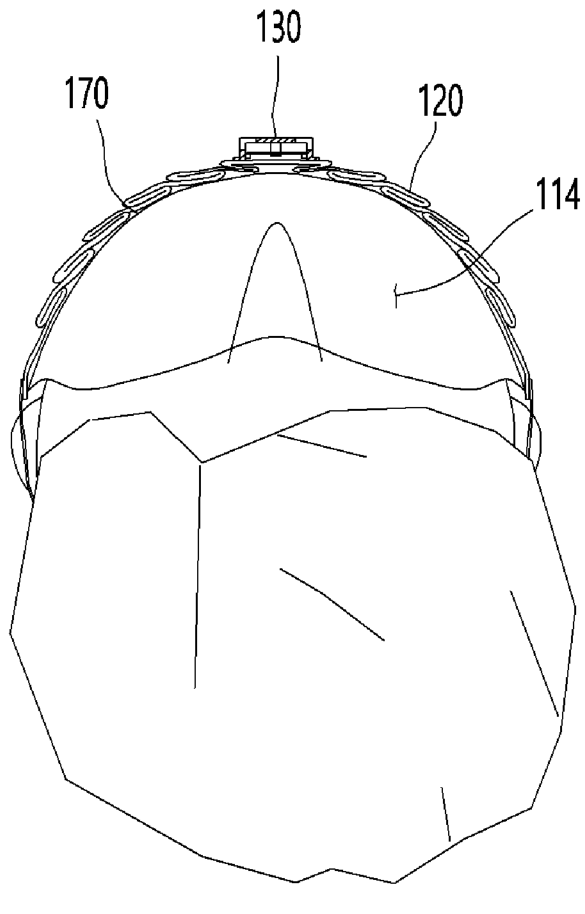
FIG. 9 is a cross-sectional view taken along line B-B in FIG. 6 for explaining the face mask having improved air permeability that includes the exhaust valve according to another embodiment of the present invention.

More specifically, air discharged to the outside through the exhaust valve 130 may flow as indicated by the arrows illustrated in FIGS. 7 and 8.

Meanwhile, when the user, who wears the face mask 100 of the present embodiment, breathes out, the passageway, through which air is discharged to the outside from the inside of the mask main body 110, may include a passageway passing through the exhaust valve 130, and a passageway passing through the mask main body 110 including the folded part 120 so that air is discharged. In this case, the amount of air discharged through the respective passageways may vary depending on a material and airflow resistance of the mask main body 110, a structure of the exhaust valve 130.

While the exemplary embodiments of the present invention have been described above, those skilled in the art may variously modify and change the present invention by adding, changing, deleting or modifying constituent elements without departing from the spirit of the present invention disclosed in the claims, and the modification and change also belong to the scope of the present invention.

The invention claimed is:

1. A face mask having improved air permeability, the face mask comprising:

a mask main body configured to cover a part of a user's face including the user's nose and mouth;

a folded region formed by folding a part of the mask main body to increase a vent area and decrease airflow resistance when the user breathes;

support bands coupled to the mask main body and configured to support the mask main body so that the mask main body is in close contact with the user's face;

a first support part foldably coupled to a first end of the mask main body and configured to cover the user's nose;

a second support part foldably coupled to a second end of the mask main body and configured to cover the user's chin; and an exhaust valve coupled to the mask main body and configured to discharge air in one direction during exhalation, wherein the mask main body is curved to form a three-dimensional structure corresponding to the user's face as the first support part and the second support port are respectively unfolded from the first end and the second end of the mask main body, wherein, when the mask main body is in a curved state, the mask main body, together with the unfolded first support part and the unfolded second support part, forms a space portion configured to receive the user's face, wherein the folded region comprises a plurality of folded parts formed by folding the mask main body multiple times in opposite directions along folding lines extending in a vertical direction, the plurality of folded parts including:

a central folded region in which the plurality of folded parts spread outwardly as the mask main body is curved, thereby increasing the vent area; and first/second end folded regions in which a first end and a second end of the plurality of folded parts, respectively, are joined by sewing, ultrasonic joining, or thermal bonding to be fixed in a folded state, wherein the mask main body maintains the three-dimensional structure formed by unfolding the first support part and the second support part, even when the plurality of folded parts spread apart, due to the first/second end folded regions being fixed in a folded state, wherein the mask main body includes an opening portion defined by removing at least one portion of the mask main body on an imaginary vertical centerline, wherein the exhaust valve is coupled to the mask main body to cover the opening portion, wherein the exhaust valve includes a plurality of exhaust holes through which the air flows defined along an edge of one surface of the exhaust valve, wherein some of the plurality of exhaust holes are defined on a lower edge of the one surface of the exhaust valve to correspond to a flow direction of exhalation discharged from the user, wherein a remainder of the plurality of exhaust holes are formed on a side edge of the exhaust valve except for an upper side of the one surface of the exhaust valve to prevent inflow of foreign substances into the mask main body, wherein the remainder of the exhaust holes formed on the side edge define a vertical distance that is greater than a horizontal distance defined by the exhaust holes extending on the lower edge of the exhaust valve, so that the plurality of the exhaust holes correspond in shape to the central folded region, and wherein the central folded region and the exhaust valve form an air flow passageway in which the air flows into the mask main body through the central folded region and discharges outward from the mask main body through the exhaust valve.

2. The face mask of claim 1, wherein the mask main body comprises:

a filter part configured to filter out foreign substances and germs contained in the air passing through the mask main body; and a pair of cover parts having higher air permeability than the filter part and configured to cover two opposite outer surfaces of the filter part to ensure the air flow passageway by preventing the two opposite outer surfaces of the filter part folded in the folded region from contacting with one another and decreasing the vent area of the filter part.

3. The face mask of claim 1, further comprising:

an inner cover configured to cover the one surface of the exhaust valve and filter out respiratory droplets and germs discharged to the outside through the exhaust valve.

4. The face mask of claim 1, wherein the exhaust valve controls the air flow by using negative pressure generated by the user's breathing, and the air flow passageway is blocked when the user breathes in and partially opens when the user breathes out, thereby inducing the air to flow in the one direction from an inside of the mask main body to an outside of the mask main body.

5. The face mask of claim 2, wherein the filter part has a thickness in a range of 0.1 mm to 0.2 mm, and each of the pair of cover parts has a thickness of at least 0.5 mm.

* * * * *